United States Patent [19]

Salway-Waller

[11] 3,708,652
[45] Jan. 2, 1973

[54] TEMPERATURE CONTROLS
[75] Inventor: Malcolm Salway-Waller, Leicester, England
[73] Assignee: USM Corporation, Boston, Mass.
[22] Filed: Nov. 4, 1970
[21] Appl. No.: 86,907

[30] Foreign Application Priority Data
Nov. 8, 1969 Great Britain......................54,802/69

[52] U.S. Cl. ...................219/505, 219/499, 219/501
[51] Int. Cl. ...............................................H05b 1/02
[58] Field of Search.......219/499, 501, 505, 503, 504

[56] References Cited

UNITED STATES PATENTS

| 3,548,156 | 12/1970 | Davey | 219/499 |
|---|---|---|---|
| 3,329,887 | 7/1967 | Schaeve | 219/501 X |
| 2,918,558 | 12/1959 | Evans | 219/499 |
| 3,215,818 | 11/1965 | Deaton | 219/499 |
| 2,866,067 | 12/1958 | Dolan et al. | 219/499 |
| 3,426,202 | 2/1969 | Gay et al. | 250/83.3 IR |
| 3,536,923 | 11/1970 | Tellerman | 250/206 |

Primary Examiner—Bernard A. Gilheany
Assistant Examiner—F. E. Bell
Attorney—Richard A. Wise and Richard B. Megley

[57] ABSTRACT

A temperature control for an electrically heated device having an electric heating element themally contacting the device for heating the device. The heating element has a temperature variable electrical property and is connected in one arm of a bridge circuit. The bridge circuit is connected across a source of electric energy to power the heating element. The bridge cross-over current operates means for digitally controlling the electric power supplied to the bridge circuit. A pulsing circuit periodically resets the power supplied to the bridge circuit to a predetermined one of the digital magnitude.

3 Claims, 1 Drawing Figure

PATENTED JAN 2 1973
3,708,652
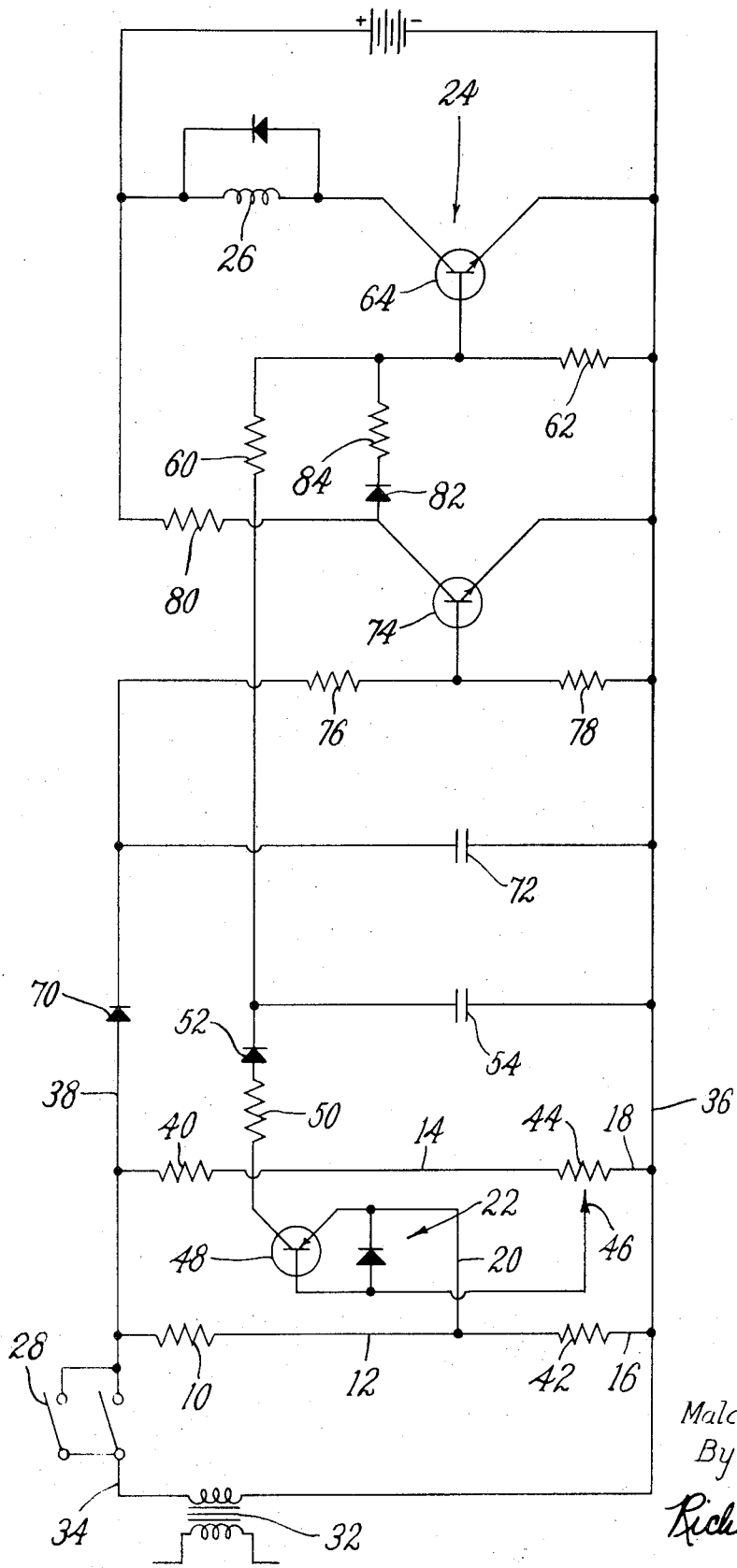
*Inventor*
Malcolm Salway-Waller
By his Attorney
Richard B. Megley

TEMPERATURE CONTROLS

BACKGROUND OF THE INVENTION

This invention relates to a temperature control for an electrically heated device. Temperature controls for such devices traditionally employ a sensing element to detect the temperature of the device to be heated and a control for heating means responsive to the sensing element. The control customarily regulates the power supplied to the heating means to control the temperature of the device. The sensing element is separate from the heating means; both the sensing element and the heating means are usually mounted on the device to efficiently sense the temperature of the device and transfer heat to the device.

Such an arrangement requires one set of electrical leads to the sensing element on the device and one set to the electrical heating means. Alternatively, the control for the heating means associated with the sensing element may be miniaturized for placement on the device. Neither alternative is satisfactory as both are detrimentally subject to the same unfavorable conditions which may exist at the place on the device where the sensing element and heating means are needed. Such conditions include vibration of the device, gross movement or rotation of the device, or a corrosive atmosphere surrounding the device. Lead wires are subject to degradation by such conditions and it is therefore desirable to minimize the number of leads required. Miniature circuits are also subject to degradation by such conditions and are additionally more costly than larger scale controls.

SUMMARY OF THE INVENTION

Accordingly it is an object of the invention to provide a temperature control for an electrically heated device which may be located remote from the device and which requires a minimum of leads to the device.

To this end a control for an electrically heated device has an electrically powered heating element thermally connected to the device for heating the device. The element has a temperature responsive electrical property and is connected in one arm of a bridge circuit. Electric current in the cross-over arm of the bridge circuit operates means for digitally controlling the magnitude of electric power connected across the bridge circuit. A pulsing circuit independently supplied with electric power periodically resets the control for the electric power supplied to the heating element to a predetermined, non-zero magnitude so that the control may not permanently shut off the power supplied to the heating element in the bridge circuit.

DESCRIPTION OF THE PREFERRED EMBODIMENT

The invention will now be more particularly described with reference to the circuit diagram of an embodiment shown in FIG. 1.

A resistive heating element 10 is thermally connected to a device (not shown) to be heated for heating the device. The element 10 is electrically connected in one arm 12 of a bridge circuit additionally comprised of other resistive arms 14, 16 and 18 and a cross-over arm 20 electrically connected intermediate pairs of the other arms. A first amplifier generally indicated at 22 is electrically connected in the cross-over arm and communicates with a second amplifier generally at 24. The second amplifier is responsive to signals from the first amplifier drives a relay coil 26 to close normally open contacts 28, a digital "on" condition. The relay contacts electrically connect a source of electric power across the bridge circuit for energizing the heating element 10 to heat the device. When the coil is not driven by the second amplifier, a pulsing circuit periodically drives the relay coil to move the contacts to the "on" position to initiate heating of the device. If the coil is not then driven by the amplifiers, the contacts reopen, a digital "off" condition, to terminate the heating of the device. The temperature of the device is thus controlled in response to signals from the first amplifier in the cross-over arm of the bridge. The first amplifier is in turn controlled by the balance of the bridge which is a function of the value of the temperature variable resistance of the heating resistor 10. The resistor 10 is thus both the sensing and the heating element of the temperature control for the electrically heated device.

An AC source of electric power from a suitable supply means is connected to a secondary winding of a transformer 32 of which a primary winding is connected to lines 34 and 36. Conveniently the voltage supplied across the lines 34 and 36 is 50 volts rms. Line 34 is connected to line 38 via the contacts 28 of the relay 26.

The bridge circuit comprising arms 12, 14, 16 and 18 is connected across the lines 36 and 38. The cross-over arm of the bridge circuit connects pairs of the other bridge circuit arms. Arms 14 and 16 have fixed value resistors 40 and 42 respectively. A center tap 46 of a potentiometer type resistor 44 is connected to one end of the cross-over arm 20. The other terminals of the resistor 44 are connected to the arms 14 and 18 respectively. The resistance of the arms 14 and 18 may thus be varied by moving the center tap of the potentiometer type resistor 44. Suitable values for the resistances 14, 16 and 18 are 5000 ohms, 11 ohms, and 2000 ohms, respectively. A suitable value for the resistance of the element 10 is 65 ohms.

The heating element 10 has a temperature responsive electrical resistance or temperature-resistive coefficient. Preferably the element is a wire wound nickel resistor so that it can be placed in intimate contact with the device to heat the device. Intimate contact insures thermal connection between the element and the device so that the temperature of the element is a function of the temperature of the device. The device thus becomes both the sensing element and the heating element of the temperature control.

The position of the center tap 46 of the potentiometer type resistor 44 in the bridge circuit is set so that the bridge is balanced when the heating element 10 and, because of the thermal connection, the device in contact with the element, are at the desired temperature. If the desired temperature is not attained, the bridge is unbalanced and an out-of-balance AC voltage appears in the cross-over arm 20 of the bridge circuit. The voltage across the cross-over arm is applied by transistor 48 via a collector output connected by resistor 50 and diode 52 to a capacitor 54. The diode 51 functions to prevent a damaging reverse voltage across the base-emitter junction of the transistor 48. The transistor 48 is conveniently a silicon P-N-P type transistor designated Texas 2S 323.

The voltage across the capacitor 54 is applied, via potential dividing resistors 60 and 62 to the base of a transistor 64 forming part of the second amplifier 24. Conveniently the values of the resistors 60 and 62 are 5.6 and 2000 ohms respectively and the transistor 64 is of the N-P-N type designated 2N 1613. One end of the resistor 62 is connected to the base of transistor 64 and the other end to the line 36 to which the emitter of the transistor 64 is also connected. The collector of the transistor 64 is connected via the relay coil 26 to a suitable source of DC power, conveniently of 24 volts.

When the contacts 28 are closed to energize the heating element 10 in the bridge circuit and the bridge circuit is not balanced, the amplified unbalance signal provided in the cross-over arm 20 provides a voltage across the capacitor 54 to maintain the transistor 64 in a conducting condition. Electric current then passes from the source of DC power through the relay coil 26 and the collector-emitter junction of the transistor 64 back to the DC source. Current through the relay coil 26 is effective to maintain the relay contacts 28 in their closed position. When the device to be heated and the heating element in thermal contact with the device have reached the desired temperature, the bridge becomes balanced, and no voltage appears in the cross-over arm 20 of the bridge. When no voltage is applied to the base of the transistor 48 in the cross-over arm the transistor 48 ceases to conduct. The voltage in the capacitor 54 then discharges through the resistor 60 and 62. As the voltage in the capacitor 54 falls, the voltage applied to the base of the transistor 64 connected to the capacitor 54 also falls until the transistor 64 is cut off. The transistor 64 then ceases to conduct, current through the relay coil 26 is cut off, and the relay contact 28 opens to cut off power to the bridge circuit and the heating element 10 in the bridge circuit. Heating of the device then terminates.

Since no power is supplied to the bridge circuit when the relay contacts 28 are open, variations in the temperature of the device and the thermally connected heating element 10 are not effective to initiate further heating; there is no source of energy to provide a voltage in the cross-over arm 20 of the bridge circuit to again close the contacts 28 to initiate heating of the device. Therefore, the circuit is provided with a pulsing circuit for turning the transistor 64 to a conducting condition to thereby close the contacts 28 and re-initiate heating of the device. The pulsing circuit turns on the transistor 64 at convenient intervals, for example every 10 seconds. The pulsing circuit samples the temperature of the device to ascertain if the temperature is still such that the bridge remains balanced. If the bridge is still balanced, the transistor 64 immediately cuts off after receiving the pulse from the pulsing circuit as described above. After another interval the pulsing circuit again samples the temperature of the device in a process which is repeated until further heating of the device is required.

When further heating of the device is required, the bridge becomes unbalanced because of the temperature responsive resistance change in the element 10. When the bridge is unbalanced a voltage again appears in the cross-over arm 20 of the bridge and the transistor 48 is then effective to maintain the transistor 64 in a conducting condition such that the relay coil 26 is energized to close the contacts 28 to provide electric power to the heating element 10. Heating of the device continues until the bridge is again balanced by the temperature responsive change in the resistance of the element 10 at which point voltage in the cross-over arm terminates and the contacts 28 open to terminate heating of the device.

The pulsing circuit for periodically sampling the temperature of the device comprises a rectifier 70 and a capacitor 72 connected across the lines 38 and 36. Another transistor 74 is also connected across lines 38 and 36 via potential dividing resistors 76 and 78. The resistor 74 is conveniently of the N-P-N type designated 2N 1613; the resistors 76 and 78, 50k ohms and 10k ohms respectively. The collector of the transistor 74 is connected via resistor 80, conveniently of 10k ohms, to the source of DC power. The collector of transistor 74 is also connected via diode 82 and resistor 84 to the base of the transistor 64. The diode 82 provides a 0.5 volt drop to insure that the saturation voltage of the transistor 64 is not high enough to cause the transistor 74 to conduct. The resistor 84 is conveniently 5.6 ohms.

Since the line 38 connected to the base of transistor 74 is connected to the source of AC power by the contacts 28, the capacitor 72 is charged through the rectifier 70 and thus supplies a voltage to the base of the transistor 74. The transistor 74 is thus maintained in a conducting condition and an essentially zero voltage therefore appears at the collector of the transistor 74. The voltage is such as not to interfere with the transistor 64 to which the collector is connected. When the contacts 28 open, the potential across the capacitor 72 discharges through the resistors 76 and 78. As the capacitor discharges, the voltage applied to the base of transistor 74 becomes small enough to cut off conduction of the transistor 74. The resistors 76 and 78 determine the rate at which the capacitor 72 discharges and therefore the time interval when the transistor 74 is cut off.

When the transistor 74 is cut off, the collector-emitter junction of the transistor ceases to conduct and the voltage at the collector from the DC source then rises. The voltage at the collector of transistor 74 is connected via diode 82 and resistor 84 to the base of the transistor 64 which then begins to conduct thereby passing current through the coil 26 to close the contacts 28 to initiate heating of the device. Closing of the contacts 28 recharges the capacitor 72 which applies a voltage to the base of transistor 74. The transistor 74 then conducts and the voltage on the collector of transistor 74 falls again to a near zero value. If the bridge is balanced when the contacts 28 close the transistor 64 cuts off as soon as the transistor 74 begins to conduct and the collector voltage falls to its near zero value. If, however, the bridge is unbalanced when the contacts 28 close, a voltage appears in the cross-over arm 20 of the bridge which is effective to maintain the transistor 64 in a conducting condition to continue heating of the device.

Having thus described my invention, what I claim as new and desire to secure by Letters Patent of the United States is:

1. A temperature control for an electrically heated device comprising: an electrically powered heating element having an electric property responsive to temperature thermally connected to the device for heating the device; a source of electric power connected across the heating element; means electrically connected to the heating element and the source and responsive to the temperature responsive electric property of the element for digitally setting the source of electric power connected across the heating element to an on or off condition; and means having a pulsing circuit connected to the means for digitally controlling the source of electric power for periodically causing the digital control means to reset the source to an on condition after the control means has responded to a temperature to set the source to an off condition.

2. A temperature control as in claim 1, wherein: the electric property responsive to temperature is electrical resistance; and the digital setting means is a controllable switch.

3. A temperature control as in claim 2 and additionally comprising means electrically connected to the switch and responsive to the temperature induced resistance for controlling the switch for maintaining the digital setting of the source in an on condition until a predetermined temperature and induced resistance is reached.

* * * * *